(12) United States Patent
Tsai

(10) Patent No.: US 8,731,615 B2
(45) Date of Patent: May 20, 2014

(54) DISPLAY DEVICE WITH MOBILE COMMUNICATION

(75) Inventor: Chin-Tu Tsai, Taoyuan County (TW)

(73) Assignee: Heran Co., Ltd., Taoyuan County (TW)

( * ) Notice: Subject to any disclaimer, the term of this patent is extended or adjusted under 35 U.S.C. 154(b) by 23 days.

(21) Appl. No.: 13/484,244

(22) Filed: May 30, 2012

(65) Prior Publication Data
US 2013/0023308 A1  Jan. 24, 2013

(30) Foreign Application Priority Data

Jul. 22, 2011  (TW) .............................. 100213610 A

(51) Int. Cl.
*H04B 1/38* (2006.01)
*H04M 1/00* (2006.01)

(52) U.S. Cl.
USPC ........................................ 455/558; 348/14.05

(58) Field of Classification Search
USPC ........................... 455/558; 340/3.1; 348/14.05
See application file for complete search history.

(56) References Cited

U.S. PATENT DOCUMENTS

| 8,473,326 B1* | 6/2013 | Griffith et al. ................ 705/7.32 |
| 2009/0174990 A1* | 7/2009 | Ligtenberg et al. ...... 361/679.01 |

FOREIGN PATENT DOCUMENTS

| CN | 201323626 Y | * 10/2009 | ................ H04N 5/44 |
| GB | 2451198 | * 1/2009 | ............. H04L 29/04 |

OTHER PUBLICATIONS

Translation for CN 201323626Y, Oct. 2009.*

* cited by examiner

*Primary Examiner* — Lee Nguyen
(74) *Attorney, Agent, or Firm* — Rabin & Berdo, P.C.

(57) ABSTRACT

The present invention relates to a display device with mobile communication, and more particularly to a display device configured with a processing unit which is led to the subscriber identity module (SIM) card module, enables the display device equipped with functions of mobile communication and networking for environmental safety.

8 Claims, 6 Drawing Sheets

DISPLAY DEVICE WITH MOBILE COMMUNICATION

BACKGROUND OF THE INVENTION

1. Field of the Invention

The present invention relates to a display device with mobile communication, and more particularly to a display device formed with a configuration of subscriber identity module (SIM) card module, which enables the display device equipped with functions of mobile communication and wireless networking, and is applicable to all varieties of TV or other similar display devices.

2. Description of Related Art

Through the development of high technology specialized in display device, the traditional TV had been push into the era of LCD (Liquid Crystal Display). And, wherever the position of such LCD TV, it almost serves the function of watching TV program, DVD disk or even connection to the PC. Furthermore, the RJ45 interface had been adopted and configured in the TV display to provide internet function.

Though, it had enhanced the TV display device with cable networking. If the cable or the connection is interrupted, the networking function needs to be re-established and it results certain inconvenience and might be damaged by extra intruder intentionally. Therefore, the cable style network becomes useless when the network communication is necessary.

Due to this shortcoming, the present invention tends to provide a TV display device formed with a configuration of subscriber identity module (SIM) installed with SIM card, which enables the functions of mobile communication and wireless networking, and is applicable to all varieties of TV or other similar display devices. When the household living environment is intruded in, the display device will automatically trigger the mobile communication and wireless networking to transmit the video information via the subscriber identity module which could practically and immediately protect the household and/or living environment.

SUMMARY OF THE INVENTION

Hence, a primary objective of the present invention is to provide a display device with mobile communication which is formed with a configuration of subscriber identity module (SIM) installed with at least a SIM card, and enables the functions of mobile communication and wireless networking.

The second objective of the present invention is to provide a remote controller of the display device which could be operated as a device to dial a phone number via keying the numeric pad and the connection is further transmitted outward by the said subscriber identity module (SIM).

There is an another objective of the present invention to send the real-time image triggered by the infrared sensor and shot by the camera lens via subscriber identity module and the telecom service provider to the remote control unit and/or security unit.

In order to achieve the aforementioned objectives, the present invention relates to a display device with mobile communication and comprises a display device and a subscriber identity module, wherein the display device is further configured with a processing unit linked with an infrared sensor, a camera lens and the said subscriber identity module. Accordingly, the present invention is able to execute real-time environmental protection and instant image transmission via the mobile communication and wireless networking.

To enable a further understanding of said objectives and the technological characteristics of the invention, a brief description of the drawings is provided below followed by a detailed description of the preferred embodiments.

BRIEF DESCRIPTION OF THE DRAWINGS

The present invention can be further understood from the following drawings.

DETAILED DESCRIPTION OF THE PREFERRED EMBODIMENTS

Figure 1:
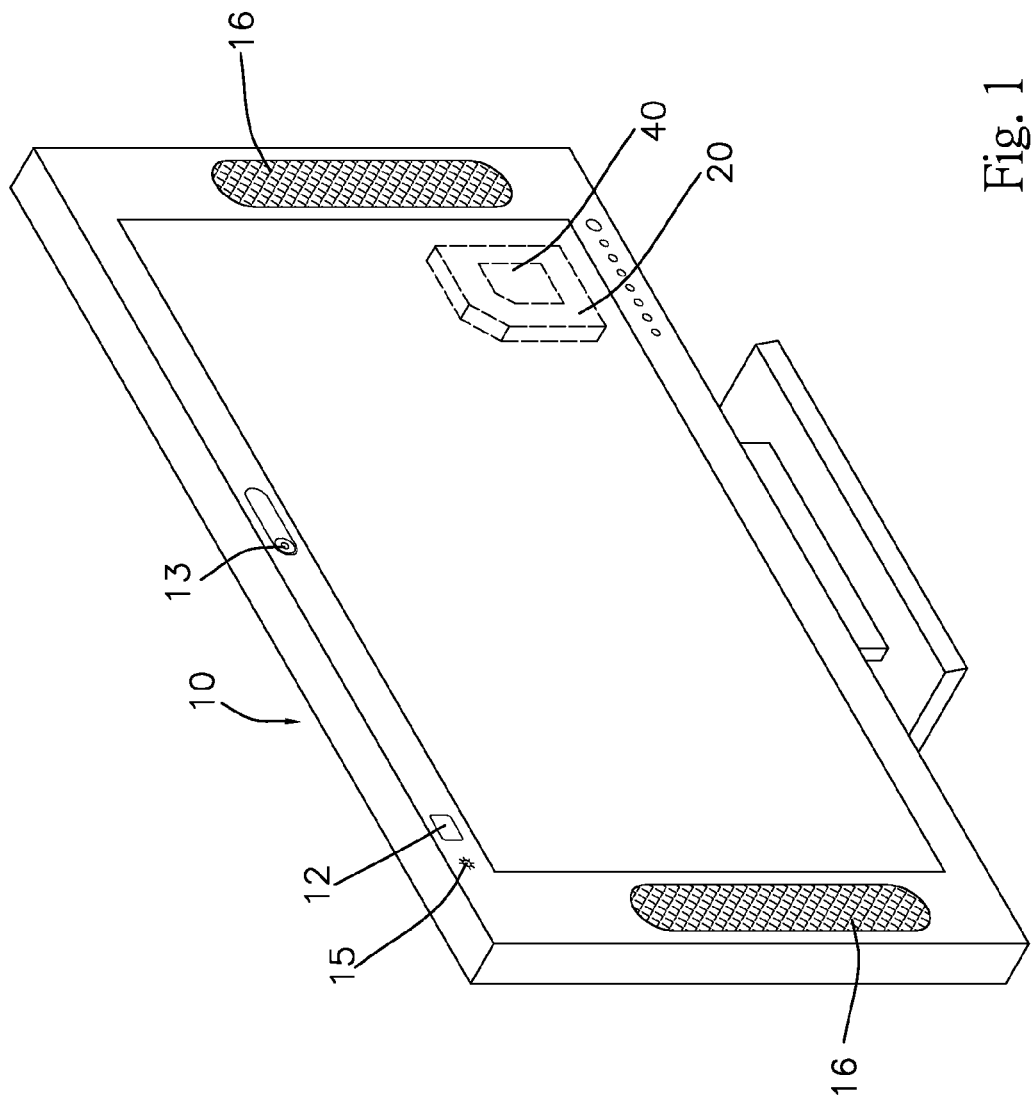
FIG. 1 is a 3-D schematic view of the present invention.
Figure 2:
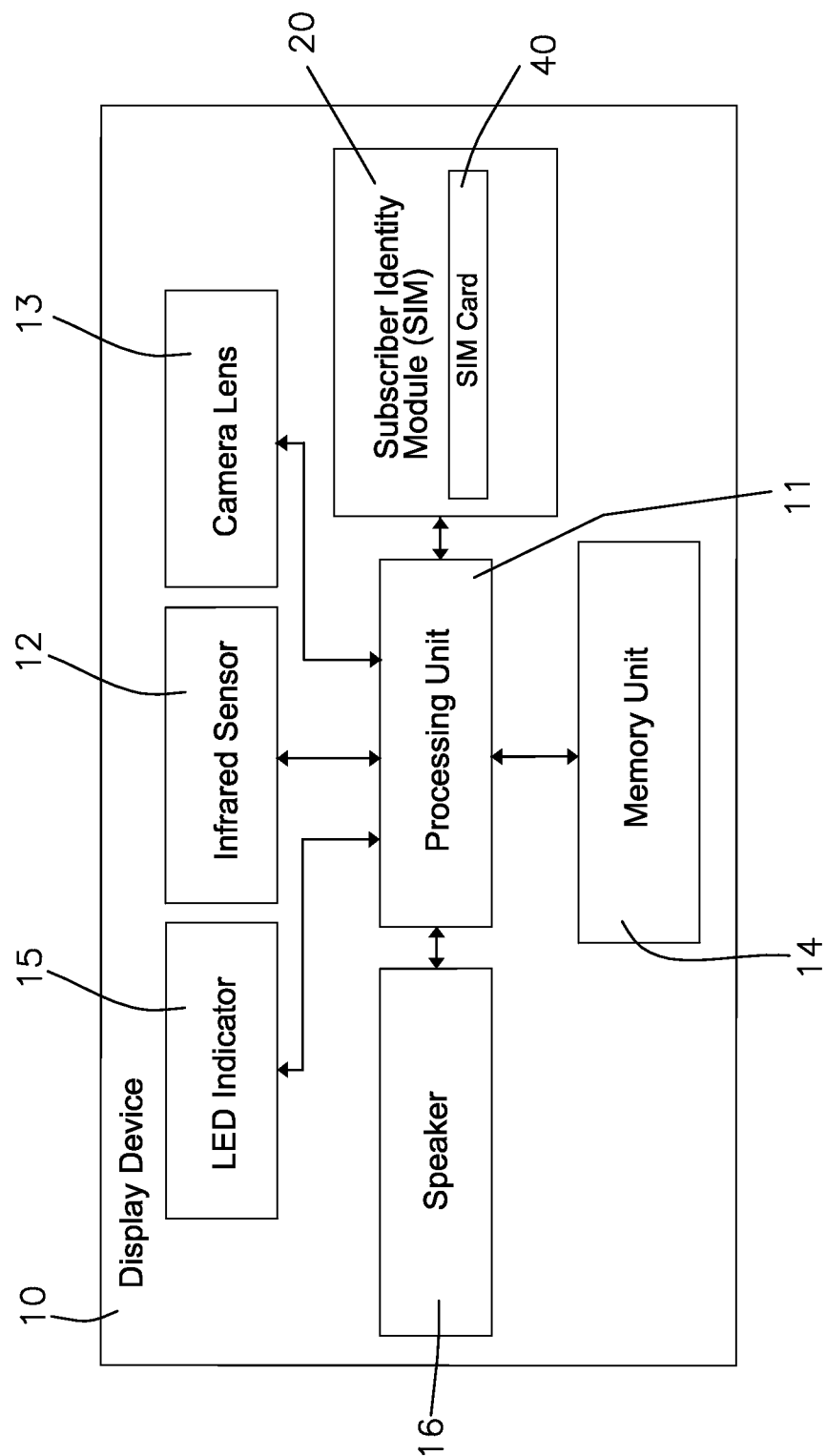
FIG. 2 is a schematic block diagram of the present invention.
Figure 3:
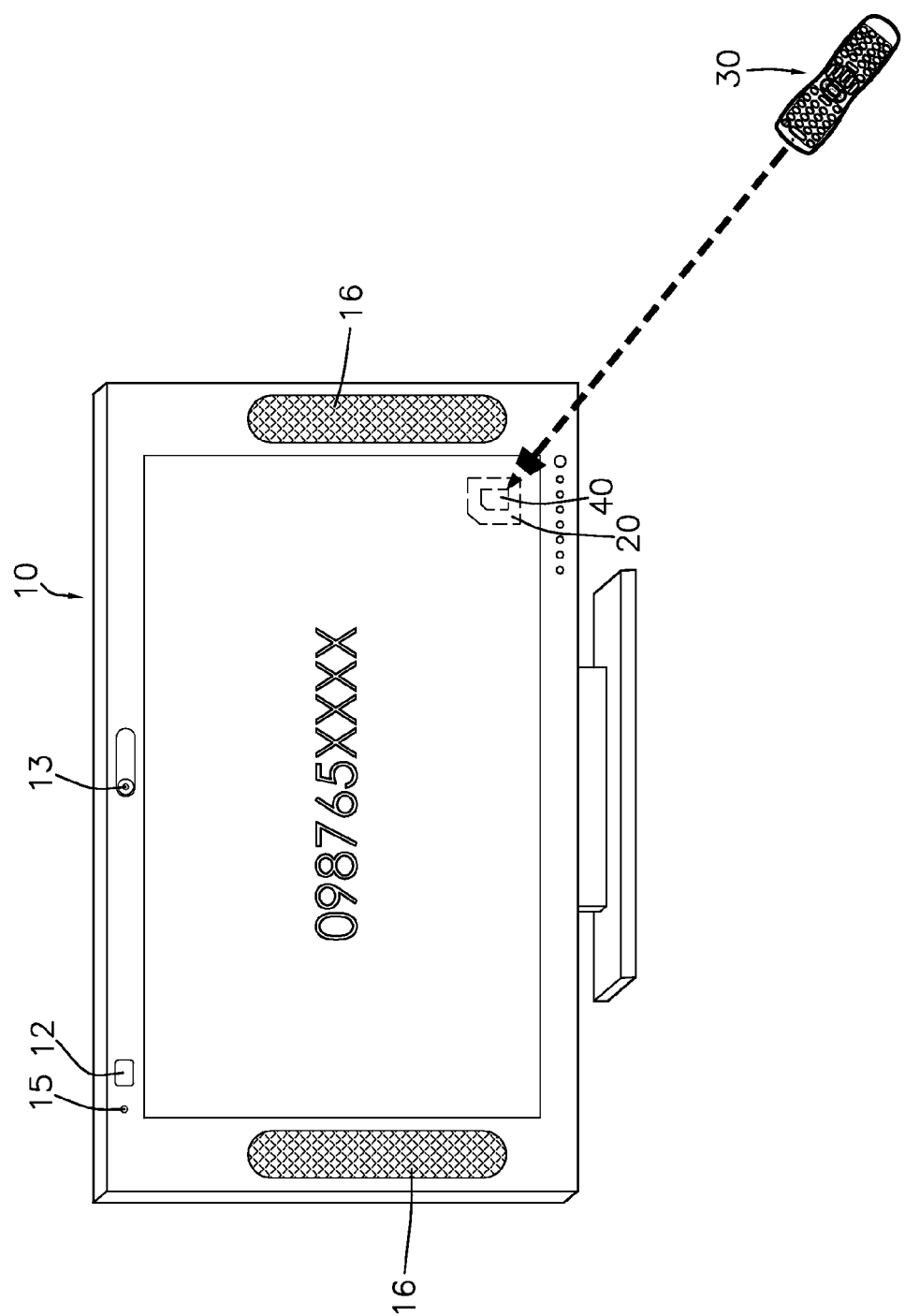
FIG. 3 is a perspective view of remote control.
Figure 4:
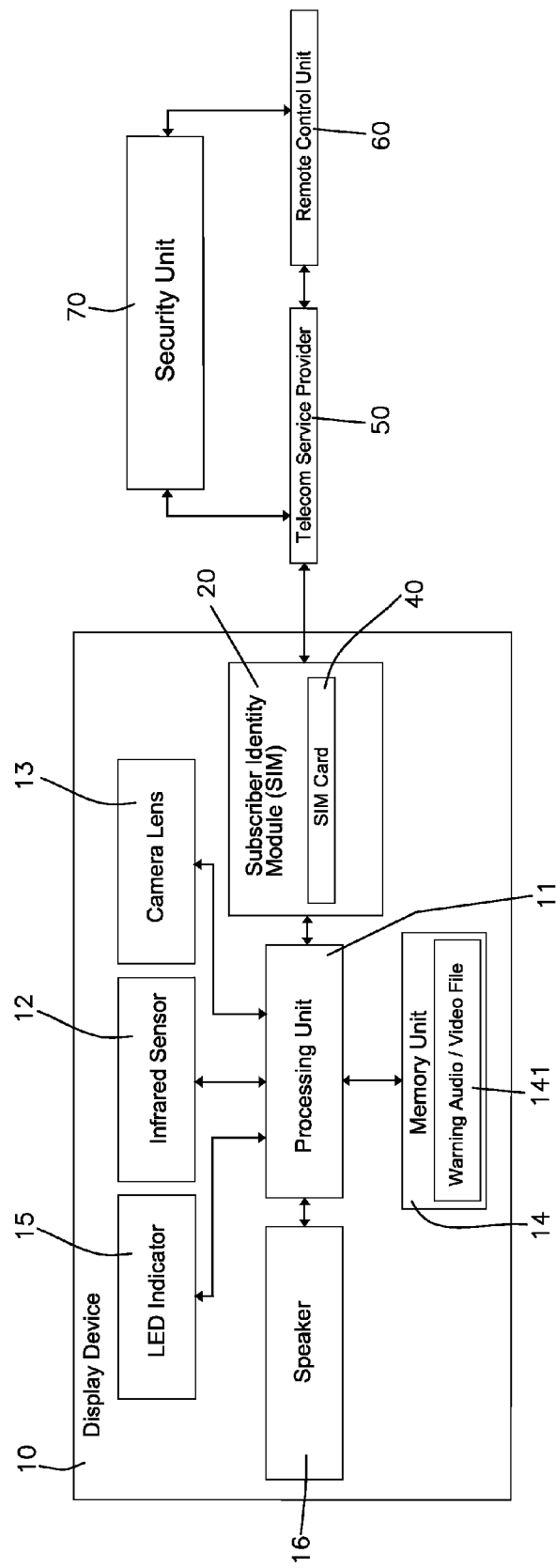
FIG. 4 is another schematic block diagram of the present invention.
Figure 5:
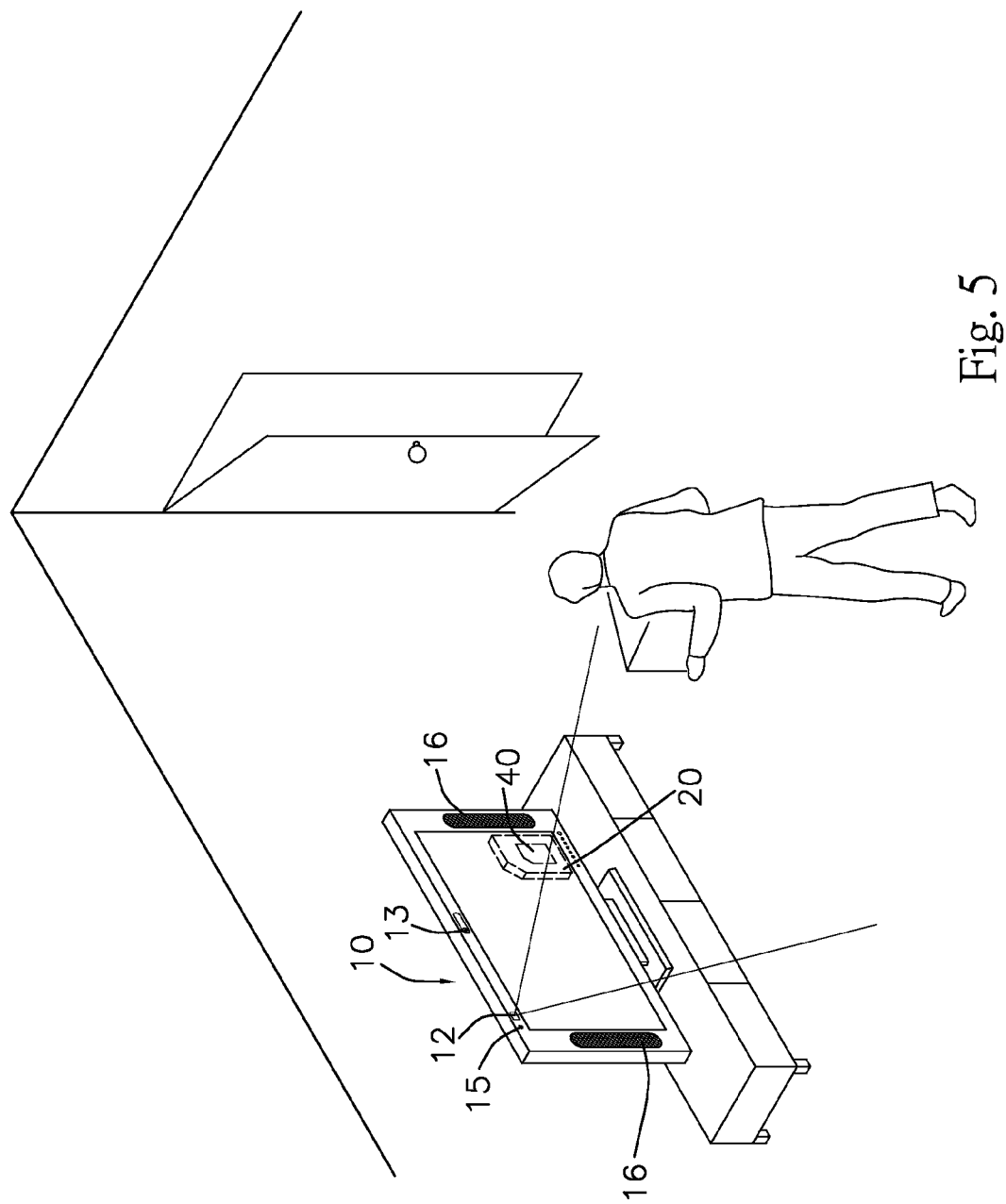
FIG. 5 is a schematic view with unknown intruder.
Figure 6:
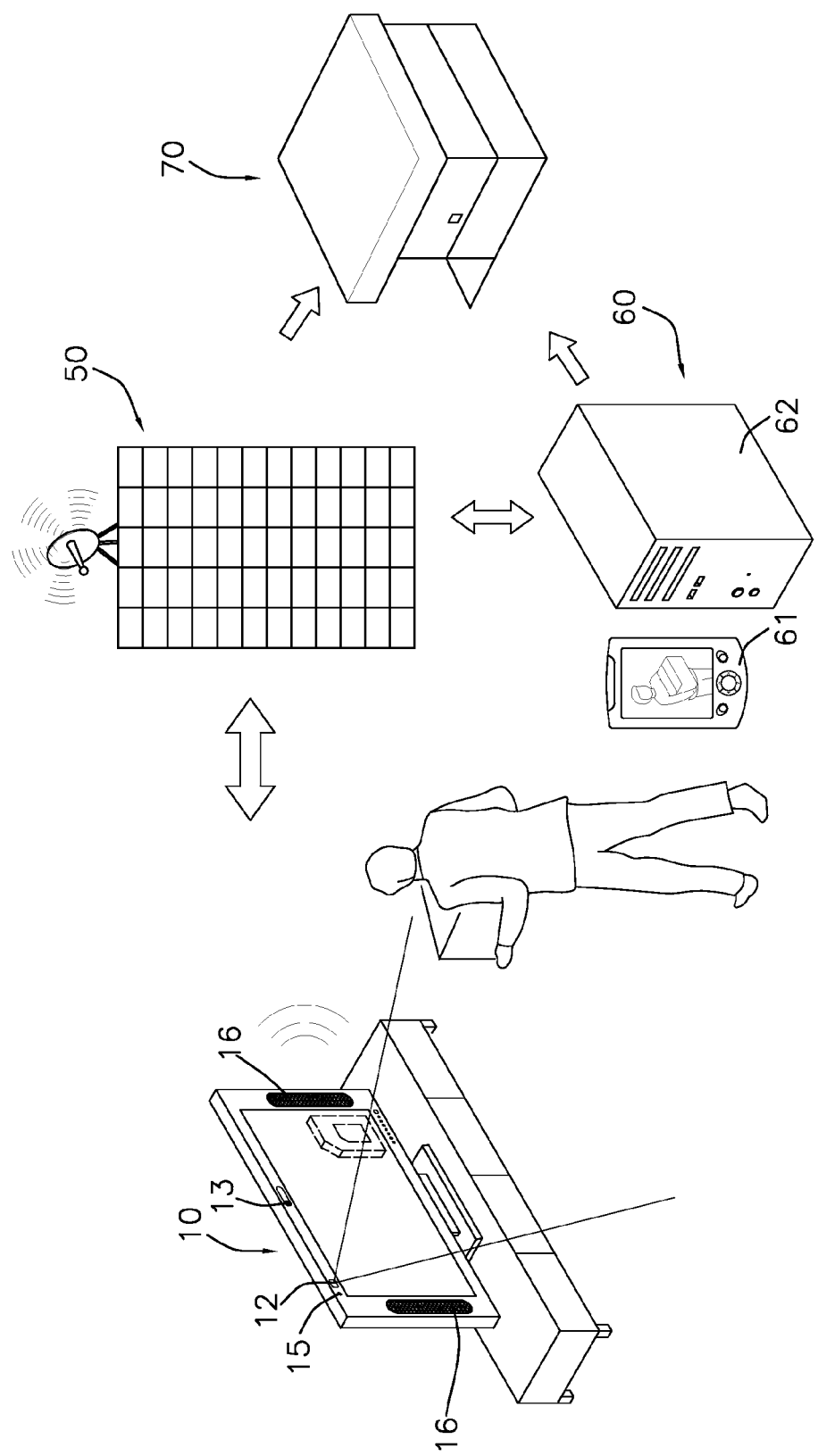
FIG. 6 is a schematic view with image of intruder transmitted by the telecom service provider

Referring to Figs from 1 to 6, the present invention relates to a display device with mobile communication and comprises a display device 10 and a subscriber identity module 20, wherein the display device 10 is further configured with a processing unit 11 linked with the said subscriber identity module 20 to perform mobile communication and wireless networking.

Meanwhile, the processing unit 11, configured in the display device 10, is linked with the telecom service provider 50 via the subscriber identity module 20. The display device 10 is further equipped with a remote controller 30 which plays a role of input media operated as a device to dial a phone number and the wireless connection is then transmitted to the display device 10 and further forwarded to the telecom service provider 50 by the said subscriber identity module (SIM) 20. Besides, the display device 10 is further equipped with an infrared sensor 12, camera lens 13, a memory unit 14, a LED indicator 15 and a speaker 16 which are separately linked with the processing unit 11. Thus, the present invention can record the image information via camera lens 13 and save it in the memory unit 14. The LED indicator 15 will be lighted up while the memory unit 14 is saving the image data. And, the infrared sensor 12 is functioned as a trigger to start recording process when the living environment is intruded in. The display device 10, via the subscriber identity module (SIM) 20, will transmit those recorded data to the terminal of telecom service provider 50 which could be extended to the remote control unit 60 to carry out remote feedback and control. The remote control unit 60 could be either a mobile phone 61 or a computer device 62. Also, both telecom service provider 50 and remote control unit 60 are further linked with the security unit 70 to organize a close anti-crime triangular network. The memory unit 14 could be configured with a warning audio/video file 141 which is played and broadcast via the speaker 16 immediately when the infrared sensor 12 is triggered to avoid any loss incurred by the extra intrusion. The LED indicator 15 will be lighted up with a different light when the image data saving is finished by the memory unit 14. Then, it is convenient for the user to detect the recording status.

Accordingly, the complete block function of the present invention can be fully realized by the aforementioned description and explanation.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A display device with mobile communication, comprising:
    a display device, which is configured with a processing unit; and
    a subscriber identity module (SIM), which is installed in the display device and linked with the processing unit to perform mobile communication and wireless networking,
    wherein the display device is further equipped with an infrared sensor, camera lens, memory unit, an LED indicator and a speaker, which are separately linked with the processing unit, and
    wherein the LED indicator will be lighted up while the memory unit is saving the image data the infrared sensor functions as trigger to start a recording process when a living environment is intruded in.

2. The display device with mobile communication according to claim 1, wherein the processing unit is linked with a telecom service provider via the subscriber identity module.

3. The display device with mobile communication according to claim 2, wherein the processing unit, via the subscriber identity module (SIM), will transmit recorded data to a terminal of the telecom service provider which could be extended to a remote control unit to carry out remote feedback and control.

4. The display device with mobile communication according to claim 3, wherein the remote control unit could be a mobile phone or a computer device.

5. The display device with mobile communication according to claim 3, wherein both the telecom service provider and the remote control unit are further linked with a security unit to organize a close anti-crime triangular network.

6. The display device with mobile communication according to claim 1, wherein the display device is further equipped with a remote controller which functions as an input media operated as a device to dial a phone number and a wireless connection is then transmitted to the display device further forwarded to a telecom service provider by the subscriber identity mudule (SIM).

7. a display device with mobile communication, comprising:
    a display device, which is configured with a processing unit; and
    a subscriber identity module (SIM), which is installed in the display device and linked with the processing unit to perform mobile communication and wireless networking,
    wherein the display device is further equipped with an infrared sensor, camera lens, a memory unit, an LED indicator and a speaker, which are separately linked with processing unit, and
    wherein the memory unit could be configured with a warning audio/video file which is played and broadcast via the speaker immediately when the infrared sensor is triggered.

8. A display device with mobile communication, comprising:
    a display device, which is configured with a processing unit; and
    a subscriber identity module (SIM), which is installed in the display device and linked with the processing unit to perform mobile communication and wireless networking,
    wherein the display device is further equipped with an infrared sensor, camera lens memory unit, and LED indicator and a speaker, which are separately linked with processing unit, and
    wherein the LED indicator will be lighted up with a different light when the memory unit finishes saving image data.

* * * * *